United States Patent
Li et al.

(10) Patent No.: US 9,559,685 B1
(45) Date of Patent: Jan. 31, 2017

(54) POWER AND DATA SWITCH

(71) Applicant: Silego Technology, Inc., Santa Clara, CA (US)

(72) Inventors: Jay Li, Sunnyvale, CA (US); Albert Chen, Saratoga, CA (US); John Othniel McDonald, Mountain House, CA (US)

(73) Assignee: Silego Technology, Inc., Santa Clara, CA (US)

( * ) Notice: Subject to any disclaimer, the term of this patent is extended or adjusted under 35 U.S.C. 154(b) by 0 days.

(21) Appl. No.: 14/798,289

(22) Filed: Jul. 13, 2015

Related U.S. Application Data

(60) Provisional application No. 62/023,745, filed on Jul. 11, 2014.

(51) Int. Cl.
*H03K 17/687* (2006.01)

(52) U.S. Cl.
CPC ........ *H03K 17/687* (2013.01); *H03K 17/6874* (2013.01)

(58) Field of Classification Search
CPC .......................... H03K 17/687; H03K 17/6874
USPC ........................................................ 327/434
See application file for complete search history.

(56) References Cited

U.S. PATENT DOCUMENTS

| | | | | |
|---|---|---|---|---|
| 4,918,690 A * | 4/1990 | Markkula, Jr. | .... | G05B 19/0421 340/9.11 |
| 5,406,249 A * | 4/1995 | Pettus | ...................... | H04B 3/56 340/12.37 |
| 5,559,377 A * | 9/1996 | Abraham | ................. | H04B 3/56 307/104 |
| 5,644,286 A * | 7/1997 | Brosh | ..................... | H04L 12/10 340/538 |
| 5,694,108 A * | 12/1997 | Shuey | ...................... | H04B 3/56 340/12.36 |
| 5,949,327 A * | 9/1999 | Brown | ..................... | H04B 3/56 340/12.36 |
| 6,195,395 B1 * | 2/2001 | Frodsham | ........... | G06F 13/4077 375/257 |
| 6,809,633 B2 * | 10/2004 | Cern | ........................ | H04B 3/56 340/12.37 |
| 6,933,835 B2 * | 8/2005 | Kline | ..................... | G02B 6/483 370/485 |
| 7,053,756 B2 * | 5/2006 | Mollenkopf | ........... | H04B 3/542 340/533 |
| 7,876,174 B2 * | 1/2011 | Radtke | ................. | G05B 13/021 333/100 |
| 8,232,667 B2 * | 7/2012 | Abraham | ............... | H04B 3/548 307/3 |

* cited by examiner

*Primary Examiner* — Kenneth B Wells
(74) *Attorney, Agent, or Firm* — Van Pelt, Yi & James LLP

(57) ABSTRACT

A single integrated circuit that supports both power switching and data switching is disclosed. In some embodiments, the integrated circuit comprises a driver circuit configured to drive a switch of an associated line in a power mode or in a data mode and one or more decoupling capacitor ground switches, wherein each decoupling capacitor ground switch connects an associated decoupling capacitor to ground in the power mode and wherein each decoupling capacitor ground switch leaves an associated decoupling capacitor floating in the data mode.

20 Claims, 4 Drawing Sheets

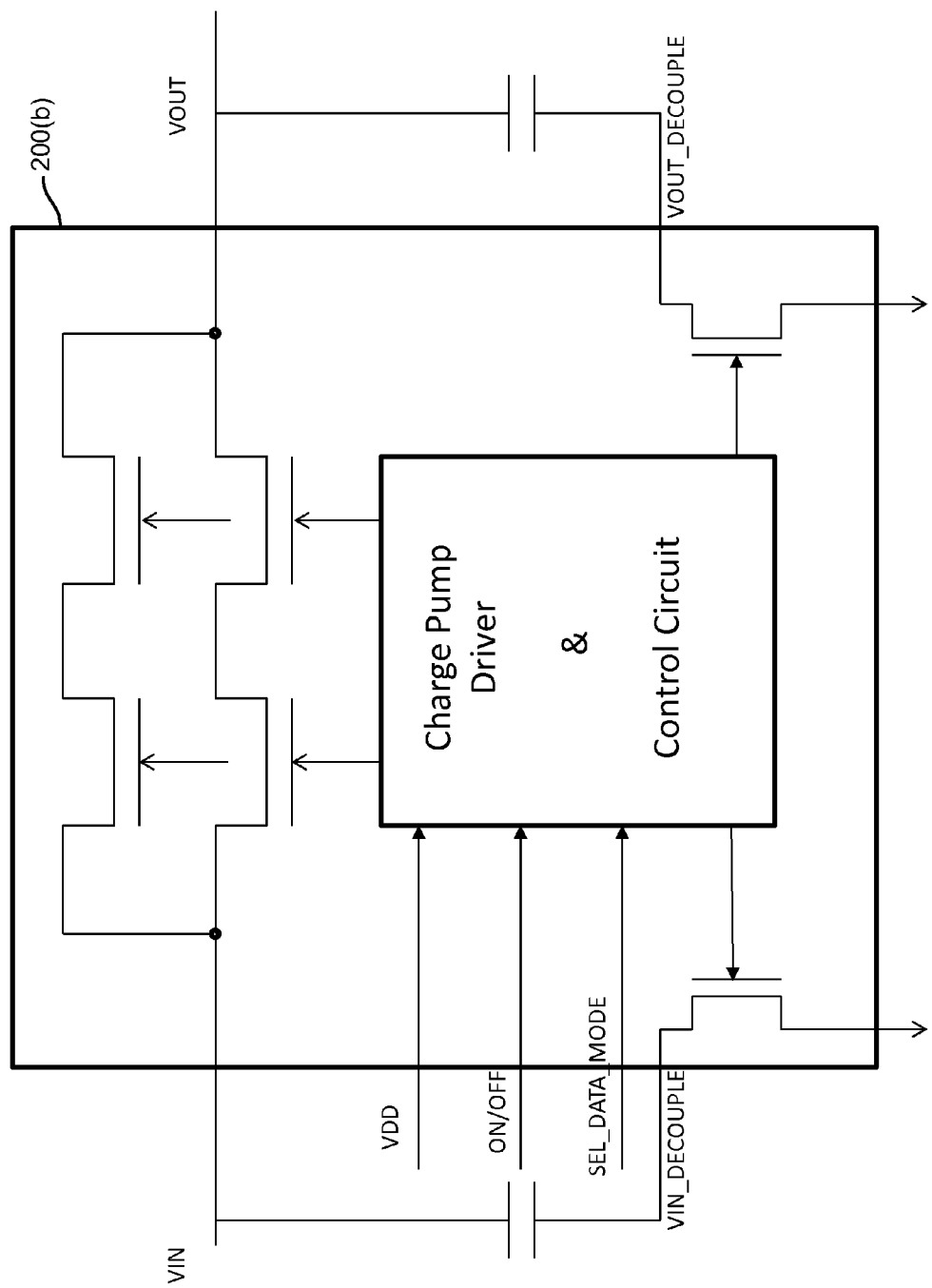

POWER AND DATA SWITCH

CROSS REFERENCE TO OTHER APPLICATIONS

This application claims priority to U.S. Provisional Patent Application No. 62/023,745 entitled BIDIRECTIONAL POWER LOAD SWITCH AND DATA SWITCH filed Jul. 11, 2014 which is incorporated herein by reference for all purposes.

BACKGROUND OF THE INVENTION

In existing electronic designs, power and data lines comprise two separate connections. That is, a power line is turned on and off using a dedicated power switch while a data line is turned on and off using a dedicated data switch. In some newer designs, the power plane has been used for limited data communication. In such cases, a power line may be used as a low speed data line to relay system management information but is not appropriate for high speed data communication. Thus, electronic systems typically require separate power and data lines and switches.

BRIEF DESCRIPTION OF THE DRAWINGS

Various embodiments of the invention are disclosed in the following detailed description and the accompanying drawings.

FIG. 2B is a high level diagram of an embodiment of an integrated circuit that supports both power and data switching across the same line.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A power switch for turning on and off a power rail is optimized for low resistance to pass power and generally comprises a large power MOSFET (metal-oxide-semiconductor field-effect transistor) having relatively low resistance but high parasitic capacitance due to its large size. Due to its high parasitic capacitance, such a power switch is not appropriate for a high speed data signal. A data switch for turning on and off a data line is optimized for low parasitic capacitance (i.e., high frequency response) to pass high speed analog data but is generally not appropriate for power due to its high resistance.

A single integrated circuit that supports both power switching and data switching is disclosed. In some embodiments, the disclosed integrated circuit comprises a single switch to support both power switching and data switching. Although some circuit configurations are described in detail below for the purposes of example, the disclosed techniques may be employed with any other appropriate circuit configurations.

Figure 1A:
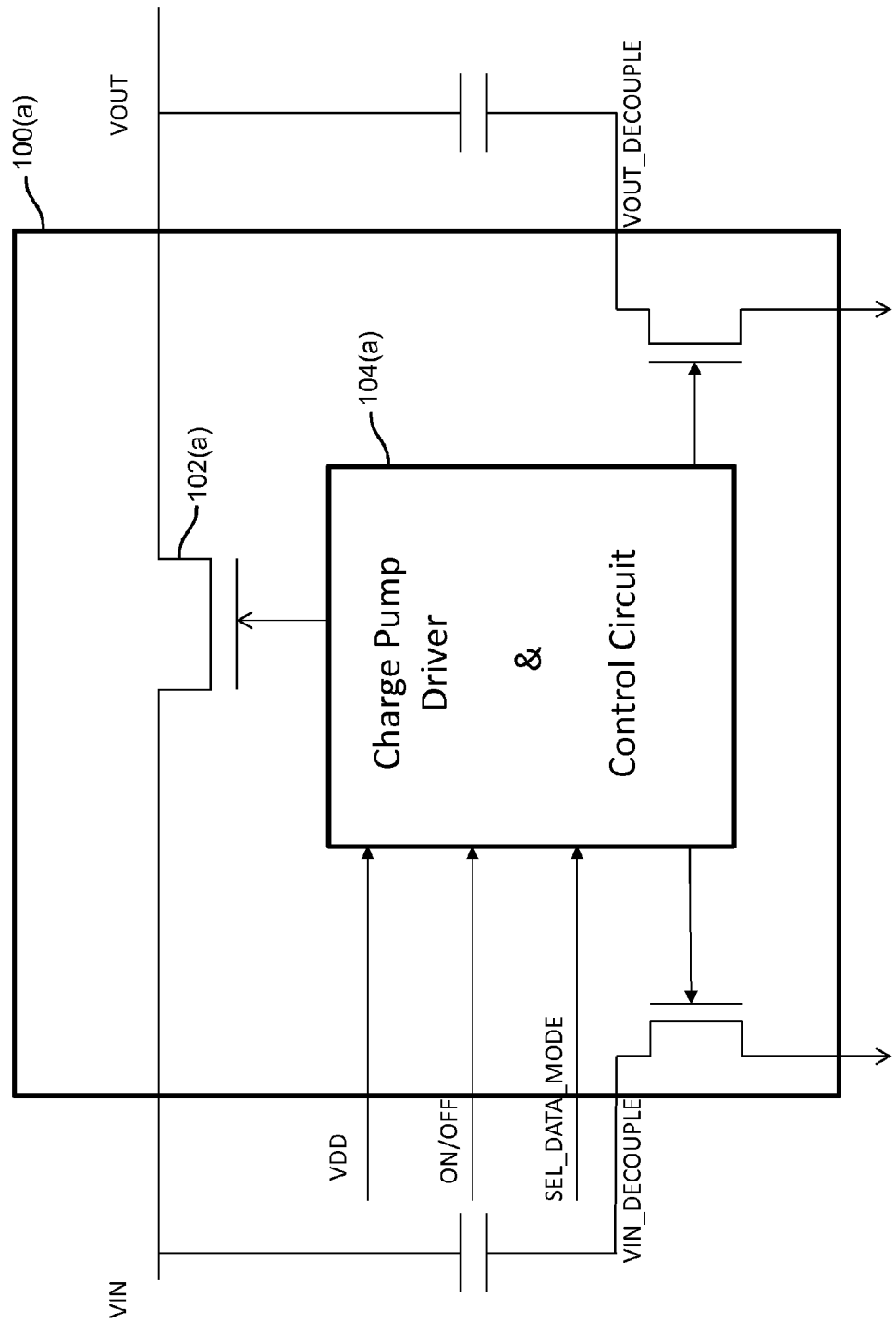
FIG. 1A is a high level diagram of an embodiment of an integrated circuit that supports both power and data switching across the same line.
Figure 1B:
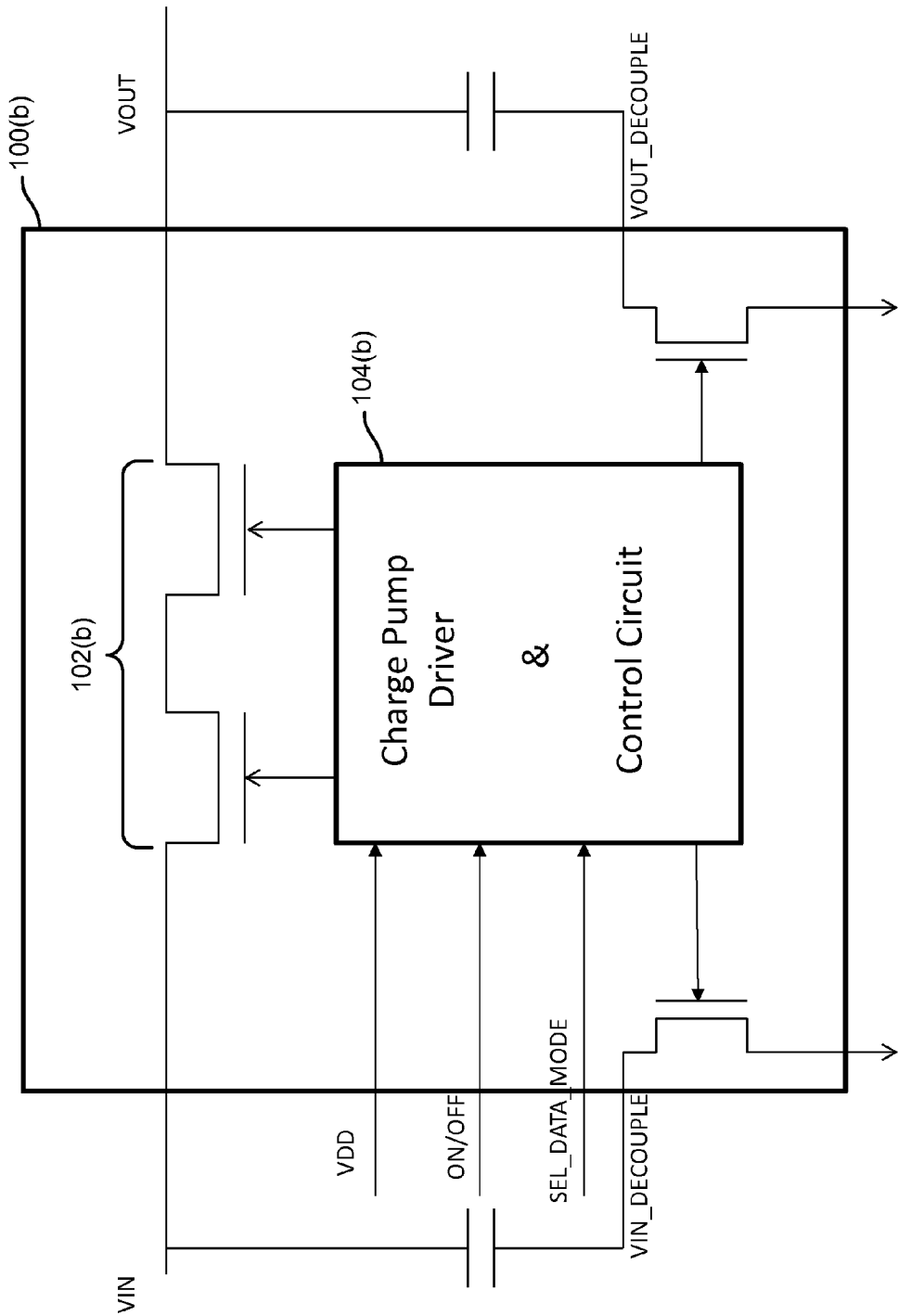
FIG. 1B is a high level diagram of an embodiment of an integrated circuit that supports both power and data switching across the same line.

Each of FIG. 1A and FIG. 1B is a high level diagram of an embodiment of an integrated circuit 100 that supports both power and data switching across the same line. A single switch 102 supports both power switching and data switching. In the embodiment of FIG. 1A, switch 102(a) comprises a single power MOSFET. In the embodiment of FIG. 1B, switch 102(b) comprises two MOSFETs configured in series in a back-to-back reverse blocking configuration. In various embodiments, the MOSFET(s) of switch 102 may comprise n-channel or p-channel devices.

As depicted, integrated circuit 100 comprises various input pins. Input pin SEL_DATA_MODE comprises an external CMOS control signal that selects to operate the device in either power mode or data mode. In various embodiments, this signal may be active high or active low. Input pin VDD comprises a separate power supply pin. The VDD pin provides power supply to the internal charge pump driver, control circuitry, and other functional blocks. These blocks increase parasitic capacitance of the power line. Thus, connecting the VDD pin to a non-data mode power node will help reduce the parasitic capacitance of the data line in the system design. In data mode, the VDD pin is used as a voltage reference since VIN carries an active data signal that cannot be used as a stable voltage reference.

To facilitate the power and data functions, charge pump driver circuit 104 drives different voltage levels on the MOSFET gate(s) of switch 102 depending on the mode of operation. In power mode, a MOSFET gate is driven to a higher voltage to reduce resistance. In data mode, a MOSFET gate is driven to a lower voltage level to allow CMOS swing levels to pass through. Depending on power or data mode, charge pump driver circuit 104 generates different voltages by referencing the VIN pin or the VDD pin. Specifically, charge pump driver circuit 104 references the VIN pin during power mode since VIN comprises a DC voltage level during power mode. During data mode, VIN is a moving analog data signal instead of a stable DC voltage level. Thus, charge pump driver circuit 104 cannot reference the VIN pin during data mode but instead references the VDD pin.

In a power switch, one or more large sized discrete decoupling capacitors (e.g., 1 uF to 100 uF) are generally added before and/or after the power switch to stabilize instantaneous power surge and/or to filter power line noise. The examples of FIGS. 1A-1B include two external decoupling capacitors situated on either side of switch 102. However, the added decoupling capacitance increases the total capacitance of the line and reduces the bandwidth of the data mode by introducing an RC (resistor-capacitor) filter on the line. In some embodiments, integrated circuit 100 includes one or more decoupling capacitor ground switches (VIN_DECOUPLE and VOUT_DECOUPLE) to help reduce line capacitance during data mode. In power mode, the internal ground switch for VIN_DECOUPLE and VOUT_DECOUPLE is on. That is, the negative side of each external decoupling capacitor is connected to ground through the internal ground switch, and each decoupling capacitor functions as a regular decoupling capacitor that guards against voltage spikes and/or filters power line noise. In data mode, the internal ground switch for VIN_DECOUPLE and VOUT_DECOUPLE is off. That is, the negative side of each external decoupling capacitor is floating. When a capacitor is floating, the equivalent capacitance on a line is reduced to zero. Thus, the external decoupling capacitors do not affect bandwidth in data mode.

Figure 2A:
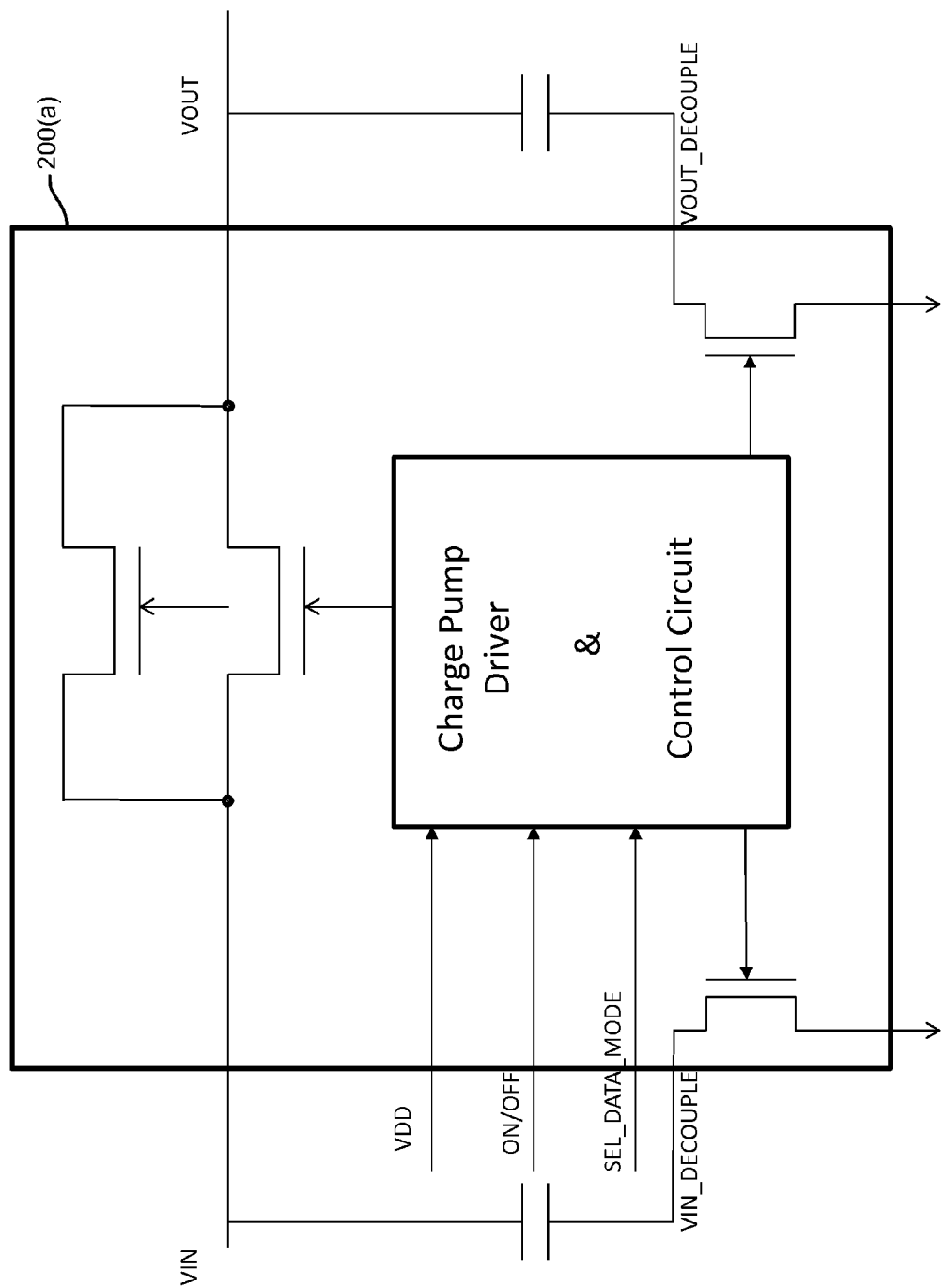
FIG. 2A is a high level diagram of an embodiment of an integrated circuit that supports both power and data switching across the same line.

Each of FIG. 2A and FIG. 2B is a high level diagram of an embodiment of an integrated circuit 200 that supports both power and data switching across the same line. Integrated circuits 200(*a*) and 200(*b*) of FIG. 2A and FIG. 2B are similar to integrated circuits 100(*a*) and 100(*b*) of FIG. 1A and FIG. 1B, respectively. However, integrated circuits 200(*a*) and 200(*b*) include parallel power switch and data switch channels instead of a single switch or channel. The power switch channel comprises larger MOSFET(s) while the data switch channel comprises smaller MOSFET(s). In the embodiments of FIGS. 2A-2B, the charge pump driver circuit does not have to adjust driving voltage based on operation mode but rather selects one of the two parallel switch paths based on the current mode of operation. Integrated circuit 200 includes one or more decoupling capacitor ground switches (VIN_DECOUPLE and VOUT_DECOUPLE) to help reduce line capacitance during data mode. As explained above, such switches facilitate switching out external decoupling capacitors during data mode.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An integrated circuit, comprising:
    a driver circuit configured to drive a switch of an associated line in a power mode or in a data mode; and
    one or more decoupling capacitor ground switches, wherein each decoupling capacitor ground switch connects an associated decoupling capacitor to ground in the power mode and wherein each decoupling capacitor ground switch leaves an associated decoupling capacitor floating in the data mode.

2. The integrated circuit of claim 1, wherein the line comprises a power rail in power mode.

3. The integrated circuit of claim 1, wherein the line comprises a high speed data line in data mode.

4. The integrated circuit of claim 1, wherein the line switch comprises a MOSFET (metal-oxide-semiconductor field-effect transistor).

5. The integrated circuit of claim 1, wherein the line switch comprises a power MOSFET (metal-oxide-semiconductor field-effect transistor).

6. The integrated circuit of claim 1, wherein the line switch comprises two MOSFETs (metal-oxide-semiconductor field-effect transistors) configured in series in a back-to-back reverse blocking configuration.

7. The integrated circuit of claim 1, wherein the driver circuit is configured to drive a gate of the switch to a higher voltage in power mode and a lower voltage in data mode.

8. The integrated circuit of claim 1, wherein the driver circuit comprises a charge pump.

9. The integrated circuit of claim 1, wherein the integrated circuit comprises an input control pin for selecting the power mode or data mode.

10. The integrated circuit of claim 1, wherein the integrated circuit comprises a power supply input pin.

11. A method comprising,
    configuring a driver circuit to drive a switch of an associated line in a power mode or in a data mode; and
    configuring each of one or more decoupling capacitor ground switches to connect an associated decoupling capacitor to ground in the power mode and to leave an associated decoupling capacitor floating in the data mode.

12. The method of claim 11, wherein the line comprises a power rail in power mode.

13. The method of claim 11, wherein the line comprises a high speed data line in data mode.

14. The method of claim 11, wherein the line switch comprises a MOSFET (metal-oxide-semiconductor field-effect transistor).

15. The method of claim 11, wherein the line switch comprises a power MOSFET (metal-oxide-semiconductor field-effect transistor).

16. The method of claim 11, wherein the line switch comprises two MOSFETs (metal-oxide-semiconductor field-effect transistors) configured in series in a back-to-back reverse blocking configuration.

17. The method of claim 11, wherein the driver circuit is configured to drive a gate of the switch to a higher voltage in power mode and a lower voltage in data mode.

18. The method of claim 11, wherein the driver circuit comprises a charge pump.

19. The method of claim 11, further comprising configuring an input pin of an associated integrated circuit as a control signal for selecting the power mode or data mode.

20. The method of claim 11, further comprising configuring an input pin of an associated integrated circuit as a power supply input pin.

\* \* \* \* \*